Sept. 30, 1941.    F. O. ALBERTSON    2,257,559
CHUCK KEY HOLDER
Filed Feb. 27, 1939
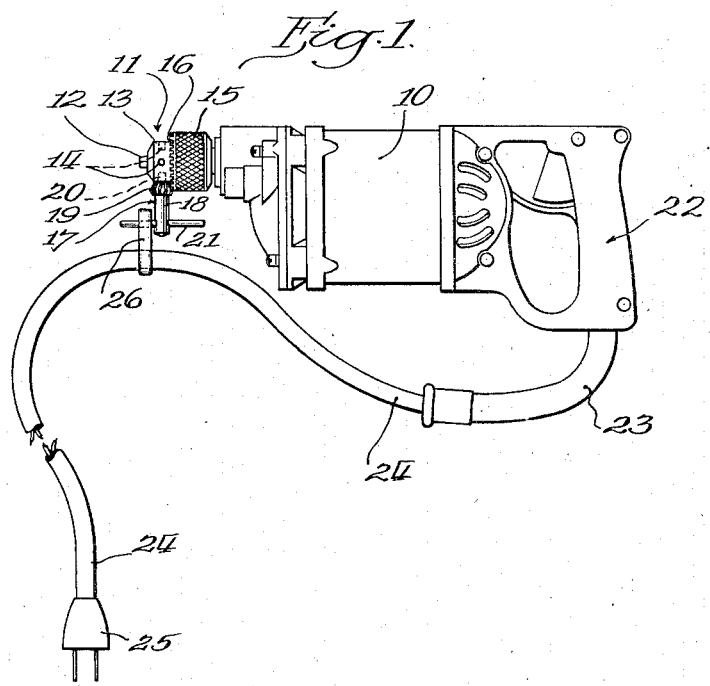
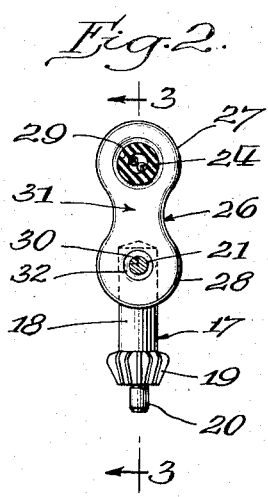
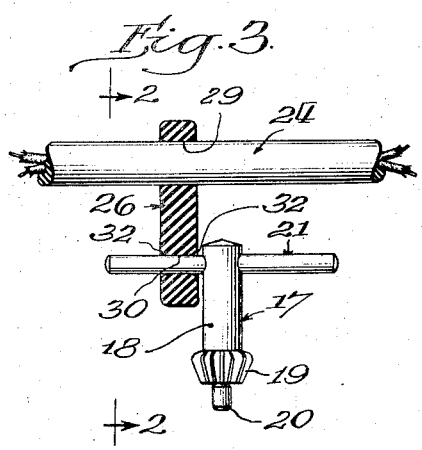
Inventor.
Frank Osbern Albertson
By
Williams, Bradbury, McCoy & Hinkle.
Attys.

Patented Sept. 30, 1941

2,257,559

UNITED STATES PATENT OFFICE 2,257,559

CHUCK KEY HOLDER

Frank Osbern Albertson, Sioux City, Iowa, assignor to Albertson & Company, Inc., Sioux City, Iowa, a corporation of Iowa Application February 27, 1939, Serial No. 258,756

1 Claim. (Cl. 248—1)

The present invention relates to chuck key holders, and is particularly concerned with devices for holding the key which is used for driving a chuck sleeve the last few turns to fasten a drill or other tool firmly in a chuck.

Such chuck keys are a practical necessity for motor driven chucks or drills, and the keys are constantly being misplaced and lost so that they are not available at the proper time.

One of the objects of the invention is the provision of an improved chuck key holder which is adapted to hold the chuck key in close proximity to the drill or chuck so that it may be applied to the chuck without release from the holder, if desired, but so that there is no possibility of the holding device getting tangled up with the drill or chuck and no possibility of leaving the key in the aperture of the chuck.

Another object of the invention is the provision of a chuck key holder which is adapted to be secured to the drill or its accessories in such manner that the holder can never be lost and the key may be used when attached to the holder or when removed from the holder.

Another object of the invention is the provision of a chuck key holder which automatically removes the key from the chuck when the key is released and which holds the key to be utilized at any time again, without possibility of loss.

Another object of the invention is the provision of a chuck key holder from which the key is removable when a removing force is applied in the right direction, but which otherwise tends to bind the key in place against removal when the key or holder is subjected to other forces, such as might occur when the holder or key are dragged over the table, floor, or other supports.

Other objects and advantages of the invention will be apparent from the following description and the accompanying drawing, in which similar characters of reference indicate similar parts throughout the several views.

Referring to the single sheet of drawings accompanying the specification:

Fig. 1 is an elevational view of a motor drill equipped with the invention;

Fig. 2 is a full sized vertical sectional view taken on the plane of the line 2—2 of Fig. 3;

Fig. 3 is a full sized elevational view of the key combined with the holder, which is shown in section on the plane of the line 3—3 of Fig. 2.

Referring to the drawing, 10 indicates a motor driven electric drill provided with a chuck 11, having jaws 12 contained in a sleeve 13, which is provided with a plurality of radially extending bores 14. The jaws 12 are adapted to be driven into clamping engagement with a shank of a drill or other tool by means of a knurled sleeve 15, which is provided with gear teeth 16 upon one end thereof.

The sleeve 15 is rotated by hand in the preliminary adjustment and tightening of the jaws 12 on a shank, but in order to secure a shank firmly in the chuck 11 it is necessary to utilize a key 17 having a shank 18, a bevel gear 19, a trunnion 20, and a transverse handle 21 consisting of a pin.

The trunnion 20 is placed in one of the apertures 14, whereupon the teeth of the bevel pinion 19 engage the gear teeth 16 on the end of the sleeve 15. The length of the handle 21 gives sufficient leverage so that the operator can drive the sleeve 15 slightly farther than could be done by hand, and the shank of a tool is gripped very firmly by the jaws 12.

Such keys are, therefore, a practical necessity, and when the key is lost the motor drill cannot be properly used.

The motor drill 10 is provided with a suitable handle 22 having a rubber hose 23 surrounding a rubber covered cable 24 anchored therein. The rubber hose is adapted to prevent sharp bending of the cable 24, which contains two conductors leading to the wall plug 25, which is used for connection to the electric line.

The holders constructed according to the invention are shown in elevation in Fig. 2, and indicated by the numeral 26. The holders are preferably wholly constructed of resilient, stretchable and elastic rubber, although in some embodiments of the invention the body might conceivably be made of more rigid material provided with such rubber inserts in one or both bores.

Each holder consists of a molded resilient rubber member, which may be of substantially uniform thickness, as shown in Fig. 3, but which is formed in plan with a pair of partially circular end portions 27 and 28, each of which is provided with a transverse bore 29 and 30.

At the intervening yoke portion 31 the body of the holder 26 may be narrower to permit bending of the holder to get the key in proper position, or when the key is to be actuated. The bore 29 is of sufficient size so that when the rubber covered cable 24 is located in the bore 29 the circular portion 27 grips the cable quite tightly, preventing the sliding of the holder 26 on the cable 24.

For this purpose the bore 29 may be slightly smaller than the outside diameter of the rubber covered cable 24. The circular formation 27 grips the rubber covered cable 24 with such force, and the friction of the rubber-to-rubber engagement is such that there is a great resistance to sliding between the key holder 26 and the cable 24. The resistance is such that the holder tends to turn inside out rather than slide.

Thus the holder is adapted to be kept in approximately the same position on the cable at all times, and does not tend to get displaced downwardly toward the drill, nor away from the drill during the use of the tool.

The bore 30 is provided at each end with a frusto-conical formation 32 which facilitates the entry of the pin 21 into the bore 30, but the bore 30 is also smaller than the outside diameter of the pin 21 so that the pin 21 is resiliently gripped by the holder 26.

The key 17 is easily removed by applying a force which acts axially of the pin 21, and the resistance to the removal of the key from the holder 26 is considerably less than that which is present between the holder and the cable. However, when the key is held in the holder 26, as shown in Fig. 3, any force other than an axial force acting on the pin 21 causes the key to bind in the holder, and causes a bending of the body or yoke 31 of the holder so that there is no tendency for the key to catch on adjacent tables, tools, or machine parts when the drill is being used. The holder permits the key to slide over such articles, and the holder bends to permit this action.

Referring to Fig. 1, the key and the holder are here shown in the position which they assume when the key is being used without removal from the holder, which is the preferred mode of use.

It will be observed that the key is in such position that it may be twisted readily and, as only a fraction of a turn is required, the cable 24 and holder 26 permit sufficient bending or twisting, so that the key may be used with the utmost freedom.

When the operator has finished with the key, it would naturally be removed by the operator; but, if not removed, the mere lifting of the drill with the cable and hose 23 in the relation shown in Fig. 1, would cause the removal of the key from the chuck. Hose 23 itself tends to straighten out the cable and draw the key from its bearing aperture 14.

Thus there is no possibility of driving the motor driven chuck with the key in the chuck.

The key holder is adapted to be used without being detached from the drill assembly at any time, and thus, if properly used, there is no possibility of its loss or misplacement. Neither can the key or its holder get entangled in the drill if the tool is properly handled, as it must be, since the addition of the holder to the cable does not introduce any additional hazards.

The cable must itself, of course, be so handled that it does not become entangled with the tool.

The present holder may be very economically manufactured, and is applied to the cable at the time of its attachment to the connector and motor so that there is no possibility of the holder getting lost.

The importance of such an article should not be minimized by reason of its small size and inexpensive character, however, as it is of the utmost importance to have the chuck key available when it is needed.

As stated before, the drill cannot be effectively used without a chuck key, and the present holder assures the availability of the chuck key at all times.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

A safety chuck key holder comprising a resilient rubber member having an aperture provided with a tapered formation at its end for receiving and frictionally engaging a rubber covered cable, said holder having a central body and having at its opposite end to the cable aperture, an aperture adapted to receive and frictionally engage the handle rod of a chuck key, said holder being mounted on a rubber covered cable in such manner that the key may be used for tightening a chuck while supported by said cable but upon release of the key by the hand and application of the tool to the work, the key is automatically removed from the chuck by the cable.

FRANK OSBERN ALBERTSON.